Feb. 23, 1932. C. E. BORING 1,846,507
CONVERTIBLE RAKING AND SWEEPING MACHINE
Filed July 5, 1929 3 Sheets-Sheet 3
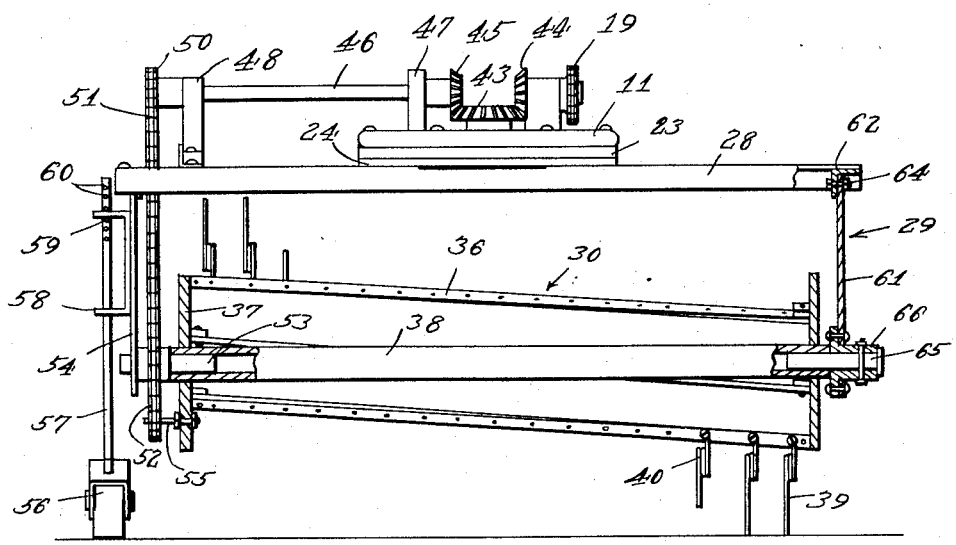
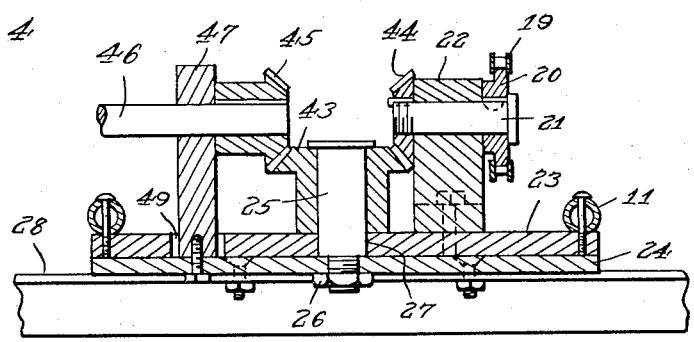
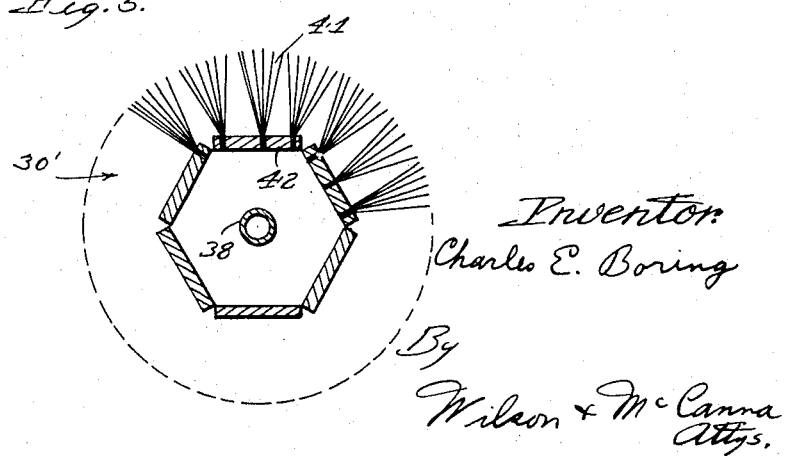

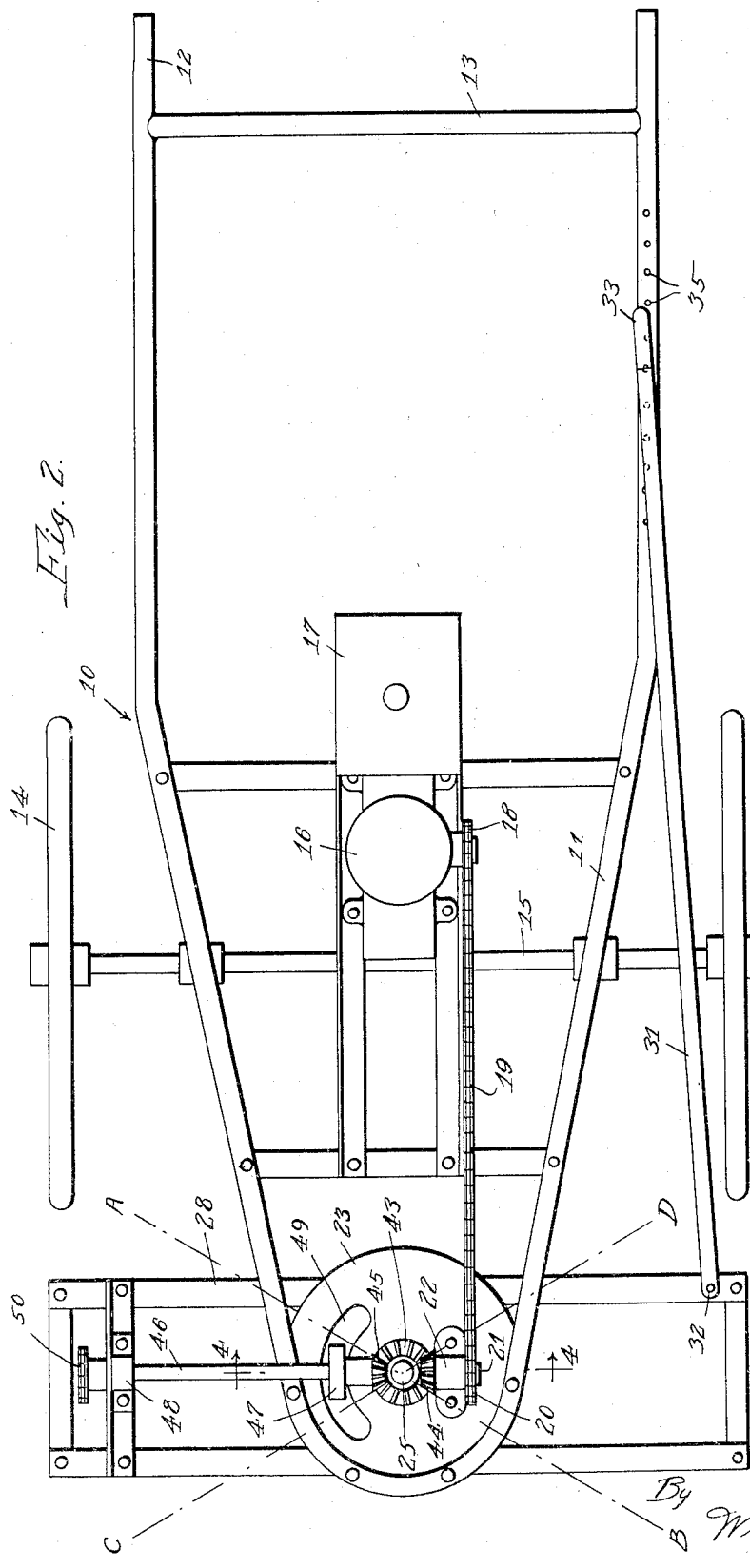

Patented Feb. 23, 1932

1,846,507

UNITED STATES PATENT OFFICE

CHARLES E. BORING, OF PLANO, ILLINOIS

CONVERTIBLE RAKING AND SWEEPING MACHINE

Application filed July 5, 1929. Serial No. 375,951.

This invention relates to a convertible raking and sweeping machine adapted for use wherever it is desired to clean up a large tract quickly, thoroughly and economically, whether it be the matter of raking up leaves or other trash or rubbish from a large expanse of lawn, or the sweeping of floors in factories, warehouses, garages, and other large buildings, as well as streets, sidewalks, or highways, or the cleaning off of snow from sidewalks and driveways.

The machine of my invention, briefly stated, comprises a push cart type of portable carrier on which a small engine is mounted to furnish the power for driving a revolving drum equipped with rake teeth for raking, or brushes for sweeping, as the case may be. Among the more important features of said machine may be enumerated the following—

(1) The provision of a machine of the character described, comprising a revolving sweeping or raking drum mounted on the frame of a push cart in front of the wheels of the latter, whereby to permit raising and lowering the drum out of or into operative position by rocking motion of the cart.

(2) The provision of a yoke for supporting the revolving drum swingable about a vertical axis with reference to the frame of the cart so as to rake or sweep toward either side as the cart is pushed along a given course, whereby to permit cleaning progressively in one direction, the yoke being shifted one way as the cart is moved in one direction on one course, and the other way when the cart is moved in the opposite direction on the next course, and so on. Provision is made whereby the yoke may be shifted by hand from the operator's position and locked in such a way that no time is lost in changing the setting of the yoke at the end of each course.

(3) The provision in connection with the shiftable yoke of transmission gearing, including an intermediate gear turning about the same axis as the yoke, whereby the shifting of the yoke does not interfere in any way with the transmission of power from the engine to the drum.

(4) The provision of an adjustable gauging roller in the form of a caster mounted on the yoke adjacent each end of the drum, the setting of which determines the depth to which the rake teeth or brushes are allowed to operate, depending on the job being done.

(5) The provision of a novel means for mounting the drum on the yoke for quick and easy removal and replacement, whereby to permit the substitution of the sweeping drum for the raking drum, or vice versa. The said means is so constructed that the removal of just one bolt enables removal of a side plate on the yoke carrying one of the two trunnions on which the drum is mounted, which then permits withdrawal of one drum and the substitution of the other. Also to be noted is the provision of a drive pin projecting from one end of the raking or sweeping drum, and arranged to be entered in a hole in the drive sprocket as the drum is slipped into place on one of its trunnions in the mounting thereof in the yoke. This pin may be provided of such size that it will break or bend and thus disconnect the drive in the event too much of a drag happens to be placed on the turning of the drum, so that there will be no danger of other more expensive parts of the machine being broken as the result of a momentary overload.

The invention is illustrated in the accompanying drawings, in which—

Fig. 2 is a plan view of the machine;

Fig. 3 is a view taken from in front of the machine omitting the push cart, and showing certain portions in vertical section on the line 3—3 of Fig. 1;

Fig. 4 is an enlarged vertical sectional detail taken on the line 4—4 of Fig. 2, and Fig. 5 is a transverse section through the sweeping drum adapted to be substituted for the raking drum appearing in Figs. 1 and 3.

The same or similar reference numerals are applied to corresponding parts throughout the views.

Figure 1:
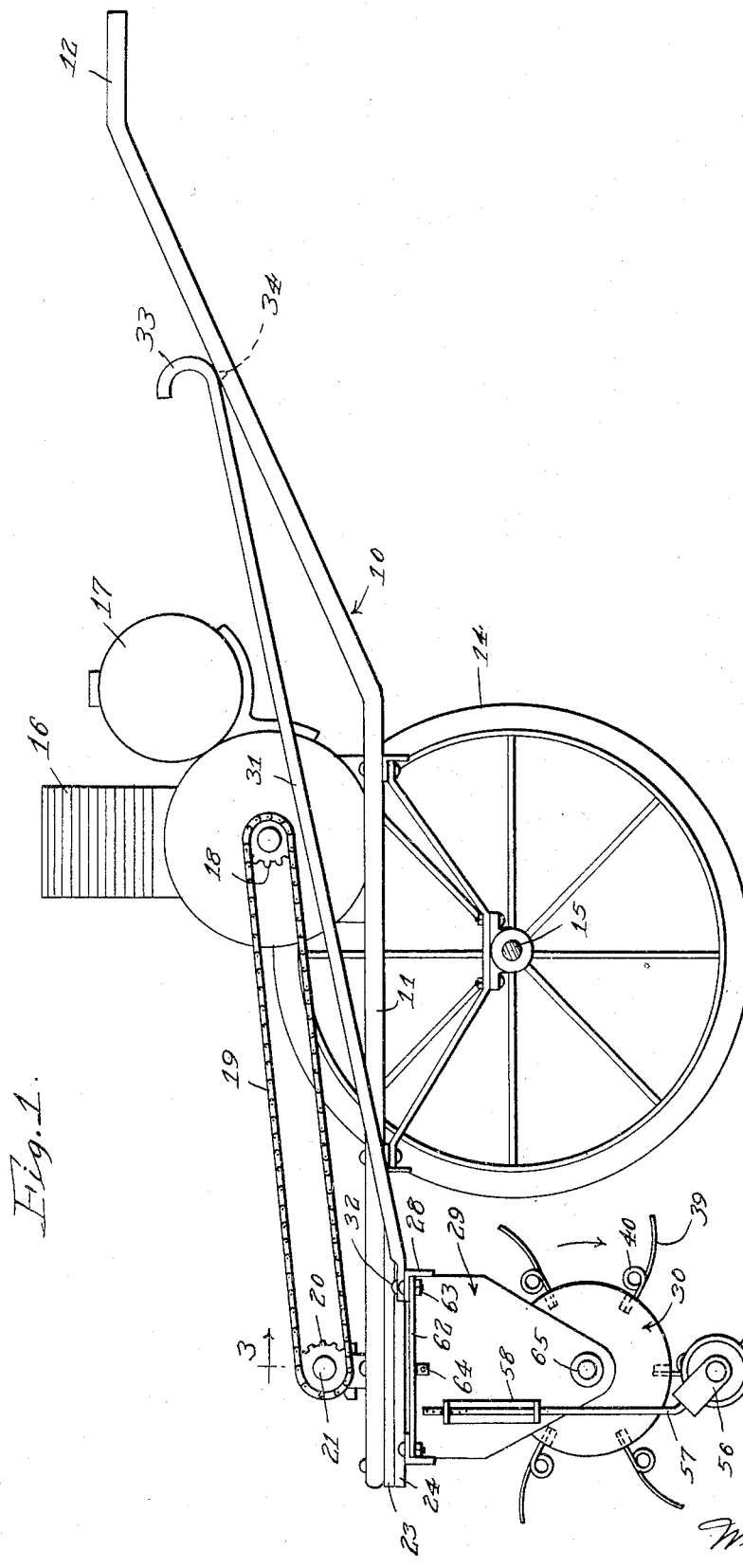
Figure 1 is a side view of the machine of my invention showing the raking drum mounted in the yoke thereof.

The raking up of leaves, trash or rubbish from large expanses of lawn, as for example, on large estates or in public parks, has been tedious, time consuming work, and involved rather high labor costs. The same is true of the work of sweeping floors in factories, warehouses, garages, and other large buildings, or the cleaning off of snow from sidewalks and driveways, when this work was done by hand in the usual way. In most instances, the saving in cost that could be effected by the use of a small portable machine of the present character would justify the purchase, because the machine would be bound to pay for itself in a very short time. For example, in small towns where the amount of street sweeping to be done hardly justifies the purchase of a large street sweeping machine of the type familiar to most everyone, there is a genuine demand for a small portable hand-controlled walking machine of the present type. The initial cost is low and the maintenance cost practically insignificant. Moreover, it does not require special skill or experience on the part of the operator so that cheap labor can be employed.

The machine, as best appears in Figs. 1 and 2, comprises a push cart 10, having the frame 11 thereof suitably formed from a single piece of pipe bent to approximately U-shape, with the free ends thereof providing handles at 12 adjacent a cross bar 13 welded or otherwise suitably secured to the frame, as shown, and with the front end thereof reaching to a point in front of the supporting wheels 14. The latter are mounted on an axle 15 on which the frame 11 is carried. A small gasoline or kerosene engine 16 is mounted on the frame 11, together with its tank 17. It is set slightly to the rear of the axle 15 so as to counterbalance the weight of the revolving drum and other appurtenances carried on the front end of the frame, and thus facilitate the maneuvering and operation of the machine. A sprocket 18 on the crank shaft of the engine has a chain 19 passing about the same and about another sprocket 20 keyed on a spindle 21 received in a bearing 22 bolted onto a plate 23 fastened onto the front end of the frame 11, as shown. The plate 23 corresponds to the upper half of a fifth wheel or turntable, and a plate 24 disposed therebeneath corresponds to the lower half. A bolt 25, secured as by means of a nut 26 in a center hole in the plate 24, bears in a center hole 27 provided in the plate 23. The plate 24 is secured to a pair of angle irons 28 constituting the frame of a yoke 29 for supporting a revolving drum 30. Thus, the yoke 29, together with the drum 30 carried thereby, is arranged to swing with reference to the frame 11 of the push cart about a vertical axis afforded by the bolt 25, so that the revolving drum can be brought to the angular position represented by the dot and dash line A—B, shown in Fig. 2, when it is desired to rake or sweep, as the case may be, to the right as the push cart is moved forwardly along a given course. If it is desired to rake or sweep to the left, as for example, as the machine is being moved in the opposite direction along the next course, the revolving drum may be brought to the angular position represented by the line C—D in Fig. 2. When the end of a given course is reached, the operator can raise the drum clear of the ground, while turning the machine around; the engine does not have to be stopped, although it may be slowed down if desired while thus running idly. The usual form of engine controls, such as are to be found on engine-driven lawn mowers and other similar devices may be provided on this machine. The operator will also take care of reversing the position of the drum from one angularity to the other at the end of each course. A rod 31, pivotally attached to the frame 28, as by means of a bolt 32, extends rearwardly to a point near one of the handles 12 where a handle 33 for operating the same is provided on the end thereof. A pin 34, projecting from beneath the handle 33, is arranged to be inserted selectively in any one of a plurality of holes 35 provided for the reception thereof in the frame 11, whereby to lock the yoke 29 securely but quickly detachably in any position of adjustment. The holes 35 are fairly close together, and enough of them are provided to permit setting the yoke with its drum in any desired position, the angularity being selected according to the job in hand. Thus, where a light sweep is being made, very little angularity is needed, and the machine can be moved along faster than is the case where the work is heavier. The drum 30 is arranged to turn in a clockwise direction, as indicated by the arrow in Fig. 1, and may be of a form having a plurality of longitudinal ribs 36 mounted on end plates 37 on a central tubular shaft 38 and provided with a plurality of spring wire raking teeth 39 secured to the ribs 36 at points spaced longitudinally thereof. Each of these rake teeth may be formed of a single piece of spring wire with a coil 40 formed near the inner end thereof to afford the desired amount of springiness, and having a suitable eyelet formed at the inner end thereof to permit fastening the same onto the drum. If desired, the teeth 39 may be of a slighty different form, rigid or semi-rigid, to scarify the surface instead of merely raking it, so as to permit seeding. On the other hand, a drum 30', such as shown in Fig. 5, may be employed for sweeping and, in that case, brushes 41 will be mounted in holes in boards 42 extending lengthwise of the drum and fastened to the end plates 37 mounted on the central tubular shaft 38. It will presently appear how one form of drum may be substituted for the other whenever desired, so that the machine is a convertible raking and sweeping machine.

The drum 30, or 30', is arranged to be driven by the engine 16 through a power take-off from the spindle 21, and the intermediate transmission must obviously provide a driving connection regardless of the position of angularity of the yoke 29 with reference to the frame 11. For that reason, I provide a bevel gear 43 turning freely on the bolt 25 and driven by the spindle 21 through a bevel gear 44 keyed on said spindle and meshing with the gear 43, as shown. Another bevel gear 45 meshes with the gear 43 and is keyed on the inner end of a shaft 46 received in bearings 47 and 48 mounted on the frame 28 of the yoke 29. The bearing 47 is fastened onto the plate 24 and extends through an arcuate slot 49 provided in the plate 23 so as to permit turning of the plate 24 relative to the plate 23 when the yoke 29 is swung in either direction from the mid position in which it appears in Fig. 2. The shaft 46 has a sprocket 50 on the outer end thereof, over which a sprocket chain 51 passes to transmit power from the shaft 46 to a drive sprocket 52 mounted freely on a stud 53 fixed on the lower end of one side plate 54 of the yoke 29. A drive pin 55 mounted on and projecting from the end of the drum 30 through a hole in the sprocket 52 provides a driving connection between the drum and the sprocket, permitting of easy removal and replacement of the drum or substitution of one drum for the other, it being understood that both drums will be provided with one of these drive pins. The pin 55 is preferably of a predetermined size, small enough to bend or break in the event the drum jams, as by encountering a rock. In that way, the drum will become disconnected from the sprocket and there will be no danger of any other more expensive part of the machine being broken. When the drive pin is bent, it can be straightened, or if broken, it can be replaced and the machine put back into operation. In that case the expense involved is insignificant. Obviously, since the gear 43 turns on the same axis with the yoke 29, it makes no difference what position of angularity the yoke occupies; the driving connection between the engine and the drum is always kept intact. If desired, I may provide a manually-controlled clutch at any point between the engine and the drum to permit throwing the drum out of gear when it is desired to halt the machine for the purpose of making an adjustment on some part thereof or for any other reason. Such a clutch could be operated by means of a pull rod extended to a point near one of the handles 12. Such devices are so well known that I have not bothered to illustrate the same.

Different jobs require that the revolving drum be maintained at different elevations. Thus, in raking a lawn, for example, it may be desired to skim lightly over the surface where it may be a matter of simply raking up leaves. In that case the drum should be kept raised to the proper elevation. On the other hand, it may be desired to rake down clear to the roots to clean out dead grass, sticks and stones. In such a case, the drum should be set for operation at a lower elevation. Then, too, the drum may be set for operation at a still lower elevation for scarifying or cultivating. For this purpose, I provide a gauging roller in the form of a caster 56, preferably one at each end of the drum, only one appearing in Fig. 3 at the left hand side of this view, owing to the fact that the right hand side of said view is in section on the line 3—3 of Fig. 1. Each caster is mounted on the lower end of a standard 57 extended through registering holes in a bracket 58 fastened onto the outer side of the side plate of the yoke 29. A cross pin 59, arranged to be entered selectively in either one of a plurality of holes 60 provided in the upper end of the standard 57, is arranged to bear against the bracket below one of the holes therein through which the standard is entered, whereby to prevent the drum from being lowered more than a certain extent. The casters 56 are, of course, free to swing laterally about their standards as an axis when the machine is turned either way from a straight line course, and will not gouge into the ground. The operator inserts the pins 59 in the proper holes 60 at the outset and in case he finds the drum is set too low, he can change its elevation by inserting the pins in the next higher holes, or vice versa.

In order to facilitate removal of one drum and substitution of the other, assuming that a drum of the kind shown at 30 and another drum of the kind shown at 30' are provided for a given machine, that being the preferred practice, although, of course, other drums may be provided in addition, for other purposes, I have made provision whereby the side plate 61, which is a companion to the plate 54, may be removed and replaced with ease and facility. It will be observed that an angle iron cross piece 62 is bolted, as shown at 63 (Fig. 1) to the frame members 28. This cross piece is arranged to have the upper end of the plate 61 bolted to the depending flange thereof, as by means of a single bolt 64, the plate fitting snugly between the depending flanges of the frame members 28 and abutting the same at front and rear, and abutting the horizontal flange of the cross piece 62 at the top thereof in order to make this method of fastening practical. The plate 61 is found to be absolutely rigid despite the fact that it is held by only one bolt. A stud 65 is removably mounted in a casting 66 secured onto the lower end of the plate 61, and this stud and the companion stud 63 constitutes trunnions on which the drum is arranged to turn, the drum having the ends of its central tubular shaft 38 fitting on said studs. When the bolt 64 is removed, it is a simple matter to slip the stud 65 out of the end of the shaft 38 and then withdraw the drum from the stud 53, whereupon the other drum may be substituted and the plate 61 replaced without any difficulty.

It is believed the foregoing description conveys a clear understanding of all of the objects and advantages of my invention. While I have made particular reference to the work of raking and sweeping, it should be evident that drums of other different descriptions might be provided in place of the drums 30 and 30' to perform other kinds of work. Furthermore, while I have made reference to various details of construction and arrangement, it will be evident that many changes might be made without seriously departing from the spirit of the invention or sacrificing the more important advantages that have been described. Accordingly, the appended claims should be construed to cover all legitimate modifications and adaptations, such as will no doubt occur to others as a result of this disclosure.

I claim:

1. A machine of the character described, comprising in a portable carrier, a frame supported on wheels, a yoke depending from said frame and having side members, a working drum disposed on a substantially horizontal axis between the side members of said yoke, a pair of trunnions for supporting the drum on the side members, one of said side members being integral with the yoke and having one of said trunnions thereon for rotatably supporting the drum, and the other side member of said yoke being detachably secured to said yoke and having the other trunnion thereon for rotatably supporting the drum, the removal of the last mentioned yoke member permitting the removal of the drum for subsequent replacement or substitution of another drum, and means for driving the drum.

2. A machine as set forth in claim 1, wherein the detachable yoke member is arranged to be secured to the yoke by a single bolt, the yoke having longitudinal angle iron frame members in spaced relation to one another, the depending flanges of which are arranged to abut the detachable yoke member at front and rear, and there being a transverse angle iron frame member secured to the longitudinal members and having the depending flange thereof abutting the detachable yoke member along the upper marginal edge portion thereof, the single bolt being entered through said depending flange and said yoke member.

3. A machine as set forth in claim 1, wherein the means for driving said drum includes a sprocket or equivalent part turning on the fixed trunnion, and a drive pin mounted on the adjacent end of said drum and projecting therefrom through a hole in said sprocket, the latter connection permitting of removal and replacement of said drum or substitution of another drum having a similar drive pin.

4. A machine as set forth in claim 1, wherein the means for driving said drum includes a sprocket or equivalent part turning on the fixed trunnion, and a drive pin mounted on the adjacent end of said drum and projecting therefrom through a hole in said sprocket, said pin being of small size and weak enough to bend or break so as to disconnect the drum from the sprocket in the event of excessive resistance to the turning of said drum.

5. A machine of the character described, comprising in a portable carrier, a frame supported on wheels, a yoke depending from said frame and having side members, a working drum disposed on a substantially horizontal axis between the side members of said yoke, and means for driving said drum, including a sprocket or equivalent part mounted on one of the side members of said yoke adjacent one end of said drum, and a drive pin projecting from the end of said drum through a hole in said sprocket, said pin being of small enough size so as to bend or break in the event of excessive resistance to the turning of said drum, whereby to disconnect the drum from the sprocket.

6. A machine of the character described, comprising in a portable carrier, a frame supported on wheels, a yoke depending from said frame and swingable with reference thereto on a substantially vertical axis, the yoke having side members, a revolving working drum carried between the side members of the yoke on a substantially horizontal axis, an axial gear disposed on the aforesaid vertical axis and arranged to be driven, a laterally extending substantially horizontally disposed shaft mounted on the yoke having a driving connection with said gear at its inner end, means providing a driving connection between the other end of said shaft and the corresponding end of the drum, a prime mover on said frame, and means providing a driving connection between the prime mover and the axial gear.

7. A machine as set forth in claim 6 including a pair of trunnions for supporting the drum on the side members of the yoke, one of the side members being removable from the yoke to permit the removal of the drum for subsequent replacement or substitution of another drum.

8. A machine as set forth in claim 6 including a pair of trunnions for supporting the drum on the side members of the yoke, one of the side members being removable from the yoke to permit the removal of the drum for subsequent replacement or substitution of another drum, there being a sprocket on the trunnion of the other side member for transmitting drive to the drum supported on the trunnion, and means providing a quickly detachable connection between the sprocket and the adjacent end of the drum.

9. A machine as set forth in claim 6 including a pair of trunnions for supporting the drum on the side members of the yoke, one of the side members being removable from the yoke to permit the removal of the drum for subsequent replacement or substitution of another drum, there being a sprocket on the trunnion of the other side member for transmitting drive to the drum supported on the trunnion, and means providing a quickly detachable connection between the sprocket and the adjacent end of the drum, the said means comprising a drive pin mounted on the one part and projecting therefrom into a hole provided in the other part, said pin being of small size and weak enough to bend or break so as to disconnect the drum from the sprocket in the event of excessive resistance to the turning of the drum.

10. A machine of the character described comprising in a portable carrier, a frame supported on wheels, handles on the rear end of said frame for the guiding of the carrier by hand, a power driven revolving working drum in a forward position on the frame, a support for said drum whereby it is suspended from the frame, said drum being disposed for operation on the support on a substantially horizontal axis, said support being mounted on the frame for oscillation about a substantially vertical axis, and means for adjusting the drum support relative to the frame and locking the same in adjusted position, said means comprising a push and pull rod attached to the drum support at one side thereof and extending rearwardly to a point near the handle on the rear end of said frame to permit hand operation thereof from the operator's position, and means for locking the rod to the frame in different positions of adjustment.

11. A machine of the character described comprising in a push cart a frame supported intermediate the front and rear ends on a pair of wheels whereby to permit tilting of the frame, handles on the rear end of the frame for guiding the cart by hand and tilting the same when desired, a revolving working drum suspended from the front end of the frame in front of the wheels, said drum being arranged to be raised and lowered out of and into operative position in the tilting of the frame, and a prime mover mounted on the frame and having a driving connection only with the drum to operate the latter continuously, the frame being arranged to be tilted to raise the drum out of operative position to permit stopping or turning of the cart without interrupting the driving of the drum, and said prime mover being disposed to the rear of the wheels of said cart to substantially counterbalance the weight of the drum whereby to facilitate tilting of the frame.

12. A machine of the character described, comprising in a push cart, a frame supported on a pair of wheels reaching forwardly and rearwardly from the wheels, there being handles on the rear end of said frame for the guiding of said cart by hand, a revolving working drum suspended from the forward end of said frame in front of the wheels, said drum being arranged to be raised and lowered out of and into operative position by rocking of the frame relative to the wheels by means of the handles, means for driving said drum, a support for said drum whereon it is disposed for operation on a substantially horizontal axis, said support being arranged to be shifted relative to the frame of said cart about a substantially vertical axis, and means for adjusting the drum support relative to the frame and locking the same in adjusted position, said means comprising a push and pull rod attached to the drum support and extending rearwardly to a point near the rear end of said cart frame to permit hand operation thereof from the operator's position, and means for locking said rod to the frame in different position of adjustment of said drum support.

13. A machine of the character described, comprising in a push cart, a frame supported on a pair of wheels reaching forwardly and rearwardly from the wheels, there being handles on the rear end of said frame for the guiding of said cart by hand, a revolving working drum suspended from the forward end of said frame in front of the wheels, said drum being arranged to be raised and lowered out of and into operative position by rocking of the frame relative to the wheels by means of the handles, a support for said drum whereon it is disposed for operation on a substantially horizontal axis, said support being arranged to be shifted relative to the frame of said cart about a substantially vertical axis, means for driving said drum, and a pair of casters mounted on the drum support at opposite ends of said drum, said casters being vertically adjustable relative to said support and serving to gauge the elevation of said drum.

In witness of the foregoing I affix my signature.

CHARLES E. BORING.